United States Patent [19]

Nagashima et al.

[11] 4,219,932
[45] Sep. 2, 1980

[54] CHAIN SAWING MACHINE

[75] Inventors: Akira Nagashima, Kawasaki; Yasuo Saito, Tokyo, both of Japan

[73] Assignee: Kioritz Corporation, Tokyo, Japan

[21] Appl. No.: 973,843

[22] Filed: Dec. 28, 1978

[30] Foreign Application Priority Data

Dec. 28, 1977 [JP] Japan .............................. 52/157384

[51] Int. Cl.³ ............................................ B27B 17/02
[52] U.S. Cl. ...................................................... 30/381
[58] Field of Search ............. 30/381, 382, 383, 123 R; 116/300

[56] References Cited

U.S. PATENT DOCUMENTS

| | | | |
|---|---|---|---|
| 2,309,941 | 2/1943 | Drummond | 116/300 X |
| 3,540,122 | 11/1970 | Bogdan | 30/123 R |
| 3,934,344 | 1/1976 | Inaga | 30/381 |
| 4,027,620 | 6/1977 | Kirsch | 116/300 X |

Primary Examiner—Jimmy C. Peters
Attorney, Agent, or Firm—Karl W. Flocks

[57] ABSTRACT

A chain sawing machine has an engine and a chain saw driven by the engine. Handles are connected to the engine through vibration damping or shock absorbing elements. The rear handle has a surface providing an instrument board on which engine tachometer and fuel and oil gauges are provided. The tachometer and gauges are electrically energized by an electric power source which is mounted within the rear handle and which is independent of the electric power source required by the engine operation.

3 Claims, 2 Drawing Figures

CHAIN SAWING MACHINE

BACKGROUND OF THE INVENTION

1. Field of the Invention

The present invention relates to a chain sawing machine and, more particularly, to a power-operated sawing machine including sawing teeth formed on an endless chain running around a chain support and adapted to be driven by a motor such as an internal combustion engine.

2. Description of the Prior Art

Sawing machines of the class specified above were used in the past by very limited professional workmens such as woodcutters. Recently, however, sawing machines have widely been put into the market and are now also used for domestic purpose.

The conventional sawing machines, however, have not been so designed as to be suitable for use or operation by persons other than professional workmens. Maintenance and operational control of chain sawing machines are rather difficult to those who are not skilled or experienced in operating the machines.

SUMMARY OF THE INVENTION

It is an object of the present invention to provide a novel chain sawing machine which is equipped with at least one meter or gauge which gives the operator an information which can conveniently be used for the maintenance or operational control of the machine.

According to the present invention, there is provided an improved chain sawing machine comprising an engine, a chain saw including a chain support and an endless chain provided with saw teeth thereon and adapted to be driven by said engine, the improvement which comprises: an instrument board and gauge means comprising at least one meter mounted on said instrument board.

Preferably, the instrument board may be formed by a surface of a handle of the machine. The handle may be connected to the engine through vibration damping means such as shock absorbing members.

The gauge means may preferably be of digital type and may be electrically energized by an electric power source which is independent of the electric power source for the engine operation.

The above and other objects, features and advantages of the present invention will be made apparent by the following description with reference to the accompanying drawings.

DESCRIPTION OF A PREFERRED EMBODIMENT

Figure 1:
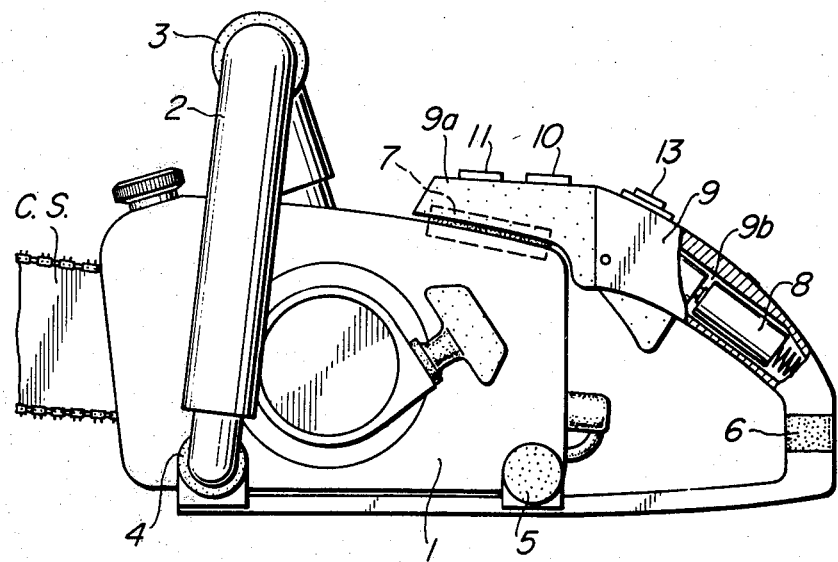
FIG. 1 is a side elevational view of an embodiment of a chain sawing machine according to the present invention with a part of the machine being cut away for the simplification of illustration.
Figure 2:
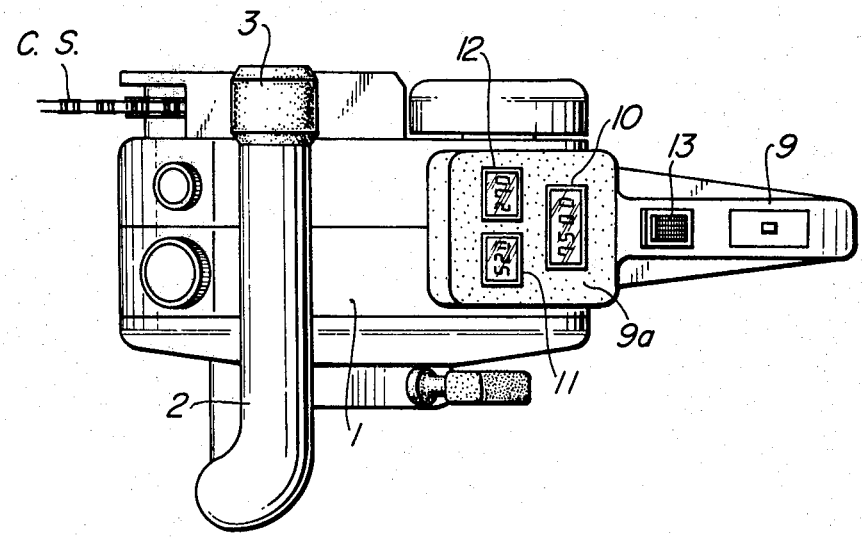
FIG. 2 is a plan view of the sawing machine shown in FIG. 1.

FIGS. 1 and 2 illustrate a chain sawing machine comprising an engine section 1 and a conventicnal chain saw C.S. (only a part of which is shown). The engine section 1 is connected with a front handle 2 through conventional vibration damping members 3 and 4 and with a rear handle 9 through conventional vibration damping members 5, 6 and 7. More particularly, the vibration damping member 7 is disposed on the top of the rear part of the engine section 1 and is connected to the undersurface of a front head portion 9a of the rear handle 9. The front head portion 9a of the rear handle has a substantially flat top surface on which meters or gauges are mounted, as will be discussed in more detail later. The central or grip section of the rear handle 9 is of a hollow structure to provide an interior space 9b which conveniently accomodates small-sized dry cells 8.

As described above, the rear handle 9 is supported at its front and rear ends by vibration damping members 6 and 7, so that the rear handle 9 is conveniently protected against the vibration caused by the engine. Thus, the flat top surface of the front end of the rear handle 9 advantageously provides an instrument board for meters or gauges which are advantageously of digital types. Digital types of meters or gauges are light-weighted and compact and free from any movable mechanical element and thus can conveniently be used as meters or gauges to be mounted on chain sawing machine on which the meters cannot completely be protected against violent vibrations.

In the illustrated embodiment of the invention, the top face of the front head portion 9a of the rear handle 9 is provided with engine tachometer 10, fuel gauge 11 and oil gauge 12 all of which are of digital types and electrically operated by the batteries 8. The batteries may be alkaline ones, mercury ones or solar batteries. These types of batteries are compact and lightweight and thus can be housed in a relatively small space. These batteries, therefore, can conveniently be mounted in the rear handle 9 adjacent to the tachometer 10 and the gauges 11 and 12.

The use of the batteries as the power source for the tachometer 10 and gauges 11 and 12 is more advantageous than the use of an existing fly-wheel magnet type generator which initially was designed as a part of the ignition system of the engine of the chain sawing machine. It will be appreciated that, if the generator has to act also as the power source for the meter and gauges 10–12, the capacity of the generator must be increased, which involves the increase of the generator components, such as the generator coils, mounting of these additional components, and the resultant increases in the machine weight and the cost of manufacture.

The engine tachometer 10 and the fuel and oil gauges 11 and 12 are operatively associated with a switch 13 for the engine. When the engine switch 13 is turned "ON", the readings of the fuel and oil gauges 11 and 12 are available even before the engine is started. The operator, therefore, can obtain an information on the amounts of fuel and lubricant oil present before the engine is started.

The engine tachometer 10 is operated simultaneously with the start of the engine operation to indicate the engine speed. The operator, therefore, can visually obtain readings of the engine speed and, thus, effectively utilize the tachometer readings to operate the engine at an accurately controlled speed.

The provision of the engine tachometer and fuel and oil gauges enables the sawing machine to be operated under controlled condition. Unduly high engine speed can be avoided to prevent unnecessary wear and consumption and thus to increase the operative life of the machine. The operator is not required to be skilled or well experienced but can easily utilize the readings of the meter and gauges to obtain controlled operation of the machine.

It has been described that the engine tachometer 10 and the fuel and oil gauges 11 and 12 are all of digital types and operatively associated with the engine switch 13. The chain sawing machine according to the present invention, however, is not limited to the described and illustrated embodiment of the invention. The digital gauges may be replaced by analog ones. In addition, the meters 10-12 can be independent of the engine switch 13.

What is claimed is

1. In an improved portable chain sawing machine comprising an engine, a chain saw including a chain support and an endless chain provided with saw teeth thereon and adapted to be driven by said engine, a front hand, a rear handle, and vibration damping means disposed between said engine and said front and rear handles, said rear handle having an end connected to the top of said engine adjacent to the rear end thereof,
    the improvement which comprises:
    a substantially flat surface on top of said end of said end of said rear handle, wherein said flat surface forms an instrument board; and
    gauge means comprising at least one meter mounted on said instrument board.

2. The improvement according to claim 1 wherein said at least one meter is a digital meter and is electrically energized by an electric power source which is independent of the power source of the engine and is housed in said rear handle.

3. The improvement according to claim 2, wherein said rear handle is hollow to form an enclosure and said electric power source comprises one or more dry cells housed in said enclosure.

* * * * *